(12) United States Patent
Wilkinson et al.

(10) Patent No.: US 11,541,610 B2
(45) Date of Patent: Jan. 3, 2023

(54) METHOD AND APPARATUS FOR SUCTION ALIGNMENT

(71) Applicant: Huber+Suhner Polatis Limited, Cambridge (GB)

(72) Inventors: Peter John Wilkinson, Cambridge (GB); Daping Chu, Cambridge (GB)

(73) Assignee: Huber+Suhner Polatls Limited, Cambridge (GB)

( * ) Notice: Subject to any disclaimer, the term of this patent is extended or adjusted under 35 U.S.C. 154(b) by 100 days.

(21) Appl. No.: 16/836,104

(22) Filed: Mar. 31, 2020

(65) Prior Publication Data

US 2020/0307116 A1    Oct. 1, 2020

(30) Foreign Application Priority Data

Apr. 1, 2019 (GB) ........................... 1904541

(51) Int. Cl.
*B29C 65/78*    (2006.01)
*B29C 65/48*    (2006.01)
(Continued)

(52) U.S. Cl.
CPC .......... *B29C 65/7808* (2013.01); *B29C 65/48* (2013.01); *B29C 65/7847* (2013.01); *G02B 6/362* (2013.01); *G02B 6/423* (2013.01); *G02B 6/4231* (2013.01); *G02B 6/26* (2013.01); *G11B 7/08* (2013.01)

(58) Field of Classification Search
None
See application file for complete search history.

(56) References Cited

U.S. PATENT DOCUMENTS 4,630,096 A    12/1986    Drye et al.
4,789,214 A    12/1988    Vilhelmsson et al.
(Continued)

FOREIGN PATENT DOCUMENTS

FR    2766930    9/2005
JP    H02258236    10/1990
(Continued)

OTHER PUBLICATIONS

"GB1904541.8 Search Report Under Section 17(5) dated Sep. 27, 2019, 4 pages.".

*Primary Examiner* — Jerry Rahll
(74) *Attorney, Agent, or Firm* — Kilpatrick Townsend & Stockton LLP

(57) ABSTRACT

A method of aligning a first and a second structure, the first structure comprising one or more first surface relief features and a channel system communicating with a surface of the first structure at one or more of the first surface relief features, the second structure comprising one or more second surface relief features shaped complementarily to the first surface relief features; the method comprising: generating suction in the channel system to draw the first and second structures together in a drawing direction; wherein, when the first and second structures are drawn together, the interaction between one or more of the first surface relief features and one or more of the second surface relief features aligns the structures in a plane perpendicular to the drawing direction such that the first and second surface relief features mate.

19 Claims, 8 Drawing Sheets

(51) Int. Cl.
  *G02B 6/36* (2006.01)
  *G02B 6/42* (2006.01)
  *G11B 7/08* (2006.01)
  *G02B 6/26* (2006.01)

(56) References Cited

U.S. PATENT DOCUMENTS

| | | | |
|---|---|---|---|
| 5,179,609 | A | 1/1993 | Blonder et al. |
| 6,100,175 | A * | 8/2000 | Wood ................ H01L 21/4853 |
| | | | 228/180.1 |
| 6,364,196 | B1 | 4/2002 | Wood et al. |
| 9,588,310 | B2 * | 3/2017 | Rahmat ................ G02B 6/4224 |
| 10,409,014 | B1 * | 9/2019 | Ramachandran .... G02B 6/4239 |
| 2003/0021541 | A1 | 1/2003 | Carpenter |
| 2005/0001896 | A1 | 1/2005 | Wakisaka |
| 2006/0174652 | A1 | 8/2006 | Khanarian et al. |
| 2007/0007733 | A1 * | 1/2007 | Hogarth ................ B23B 31/307 |
| | | | 279/3 |
| 2013/0112349 | A1 * | 5/2013 | Voigt ................ B29C 65/7802 |
| | | | 156/538 |
| 2014/0233887 | A1 * | 8/2014 | Rahmat ................ G02B 6/4231 |
| | | | 385/33 |

FOREIGN PATENT DOCUMENTS

| | | |
|---|---|---|
| JP | 2011075836 | 4/2011 |
| KR | 20130105018 | 9/2013 |
| TW | 522668 | 3/2003 |
| WO | 2015119571 | 8/2015 |

* cited by examiner

METHOD AND APPARATUS FOR SUCTION ALIGNMENT

CROSS-REFERENCE TO RELATED APPLICATIONS

This application claims priority to GB Patent Application No. 1904541.8, filed Apr. 1, 2019, titled "Method and Apparatus for Suction Alignment," the entirety of which is hereby incorporated by reference.

FIELD

This invention relates to a method and apparatus for the precision alignment of two structures utilising suction.

BACKGROUND

Precise alignment of components is of critical importance in many fields. For example, many optical, microfluidic, mechanical and electronic components require features to be precisely aligned during manufacture. As well as alignment accuracy, the speed at which components can be aligned is of importance as this affects the throughput of the manufacturing process. Furthermore, the cost of preparing the features/components to be aligned is relevant to ensuring that the manufacturing process is commercially viable.

Existing precision alignment systems generally use one or more of three conventional methods: visual passive alignment, mechanical passive alignment, and active alignment.

Visual passive alignment traditionally employs cameras and alignment markers in which components are moved to match sets of alignment markers, and then fixed by curing an adhesive. Alternatively, solder balls may be applied to locations on a substrate relative to alignment markers, and the final alignment achieved by the surface tension of the solder during the reflow process.

Visual passive alignment generally presents a trade-off between throughput and accuracy. For example, surface mount electronic pick and place can achieve precision and accuracy of roughly 10 μm with a cycle time of 3 s. Conversely, silicon wafer alignment systems tend to be slower but more accurate.

Mechanical passive alignment using features such as grooves and ridges is often used for applications where high throughput must be combined with high accuracy. However, for ease of manufacture, these features are generally limited to aligning in a single dimension.

Active alignment systems, in which components are roughly aligned by some method and then optimised using a feedback system, are often labour and/or resource intensive.

All of the aforementioned alignment methods suffer to some extent from: lateral and asymmetric movements during adhesive curing processes, having to sacrifice accuracy for speed (or vice versa), the necessity for complex and expensive aligning equipment, and the necessity for a clean room (this being expensive and preventing field-assembly of components).

There is a need for alignment methods and apparatus that address these problems.

SUMMARY OF THE INVENTION

According to the present invention there is provided a method of aligning a first and a second structure, the first structure comprising one or more first surface relief features and a channel system communicating with a surface of the first structure at one or more of the first surface relief features, the second structure comprising one or more second surface relief features shaped complementarily to the first surface relief features; the method comprising: applying suction in the channel system to draw the first and second structures together in a drawing direction; wherein, when the first and second structures are drawn together, the interaction between one or more of the first surface relief features and one or more of the second surface relief features aligns the structures in a plane perpendicular to the drawing direction such that the first and second surface relief features mate.

The one or more first surface relief features comprise tapered protrusions from the surface of the first structure and the one or more second surface relief features comprise recesses in the surface of the second structure that are tapered complementarily to the one or more first surface relief features.

The relative rotation of the first and second structures about an axis parallel to the drawing direction may be restricted by the interaction between two or more first surface relief features with two or more corresponding second surface relief features.

One or more of the first surface relief features and one or more corresponding second surface relief features may be non-cylindrically symmetric, such that the interaction between one or more of the first surface relief features and one or more corresponding second surface relief features restricts the relative rotation of the first and second structures about an axis parallel to the drawing direction.

The one or more first surface relief features may be removable from the first structure and the first structure comprises one or more recesses, each complementarily shaped to the first surface relief features, and the method may further comprise the step of inserting one or more of the first surface relief features into one or more corresponding recesses.

The channel system may comprise one or more channels passing through the first structure and one or more of the first surface relief features.

The method may further comprise the step of applying an adhesive to fix the first and second structures together.

One of the first and second structures may comprise an optical storage medium and the other of the first and second structures may comprise a machine configured to perform one or more of reading, writing, and re-writing of the optical storage medium, and further comprising the step of reading, writing, or re-writing the optical storage medium.

There is also provided an apparatus configured to be aligned, the apparatus comprising: a first structure comprising one or more first surface relief features and a channel system communicating with a surface of the first structure at one or more of the first surface relief features; a second structure comprising one or more second surface relief features shaped complementarily to the first surface relief features; and wherein, when suction is applied in the channel system to draw the first and second structures together in a drawing direction, the interaction between one or more of the first surface relief features and one or more of the second surface relief features aligns the structures in a plane perpendicular to the drawing direction such that the first and second surface relief features mate.

The relative rotation of the first and second structures about an axis parallel to the drawing direction may be restricted by the interaction between two or more first surface relief features with two or more corresponding second surface relief features.

One or more of the first surface relief features and one or more corresponding second surface relief features may be non-cylindrically symmetric, such that the interaction between one or more of the first surface relief features and one or more corresponding second surface relief features restricts the relative rotation of the first and second structures about an axis parallel to the drawing direction.

The one or more first surface relief features may comprise tapered protrusions from the surface of the first structure and the one or more second surface relief features may comprise recesses in the surface of the second structure that are tapered complementarily to the one or more first surface relief features.

The one or more first surface relief features may comprise conical or pyramidal protrusions from the surface of the first structure.

The one or more first surface relief features may comprise regular or irregular frustum protrusions from the surface of the first structure.

The one or more first surface relief features may comprise spherical segment or ellipsoidal segment protrusions from the surface of the first structure.

The one or more first surface relief features may be removable from the first structure and the first structure may comprise one or more recesses shaped complementarily to the one or more first surface relief features.

The channel system may further comprise a vacuum pump configured to apply the suction.

The first and second structures each may further comprise one or more functional features.

The functional features may comprise one or more of: light sources, lasers, photodetectors, cameras, optical memory elements, waveguides, lenslets, waveplates, and diffraction gratings, springs, latches and flexures, channels and valves.

One of the first and second structures may comprise an optical storage medium and the other of the first and second structures may comprise a machine configured to perform one or more of reading, writing, and re-writing of the optical storage medium.

There is also provided a method of manufacturing the apparatus wherein the functional features of the first structure are manufactured in the same process as the first surface relief features.

The functional features of the second structure may manufactured in the same process as the second surface relief features.

The functional features may be manufactured by ultrafast laser inscription followed by wet etching.

The method of manufacturing may further comprise metallizing electronic components on the surface of one or more of the first and second structure.

DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

Figure 1:
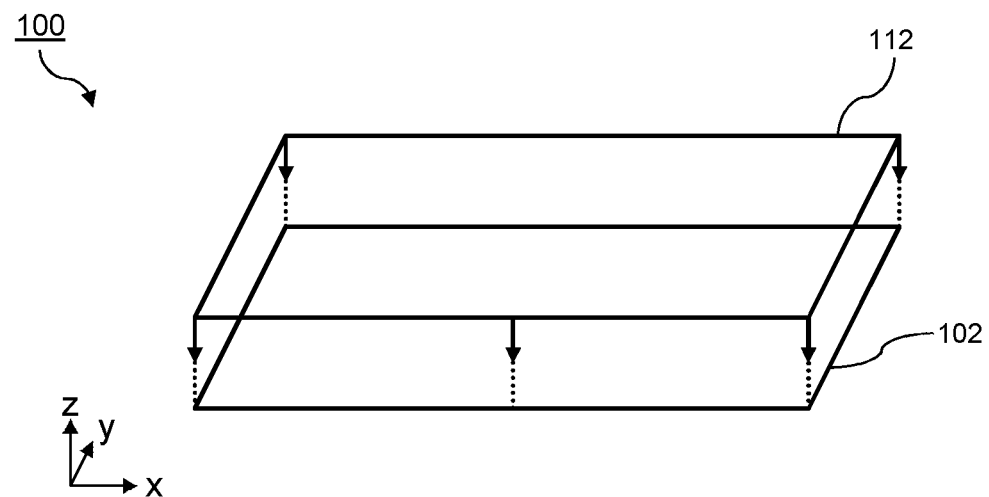
FIG. 1 shows a schematic of an alignment apparatus showing the drawing direction.

FIG. 1 illustrates an exemplary apparatus 100 comprising a first structure 102 and a second structure 112. These structures 102 and 112 are to be brought together in the z-direction (as indicated by the arrows and dotted lines) for the purpose of manufacturing a composite component comprising the two structures. Once the two structures are brought together, they may be fixed together by an adhesive. Examples of adhesives which may be used are: glue, cement, paste, solder, welding metal. The two structures may additionally or alternatively be fixed together mechanically. Examples of mechanical fixings which may be used are: latches, screws, bolts. It is desirable for the two structures to be aligned accurately in the xy-plane, with offset in the x- and y-directions minimised. Similarly, it is desirable for relative rotational offset between the two structures around all three axes to be minimised.

Figure 2:
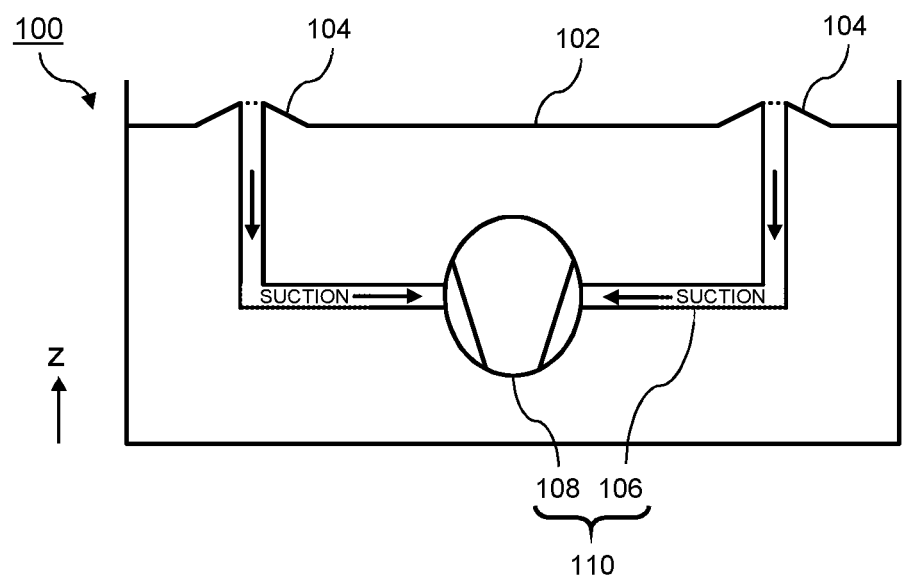
FIG. 2 shows an exemplary first structure including surface relief features and channel system.

FIG. 2 shows a side on view of an exemplary first structure 102. The first structure 102 comprises one or more surface relief features 104. In this example, two surface relief features 104, separated in the xy-plane, are shown. The first surface relief features 104 are located at the surface of the first structure 102. The exemplary surface relief features 104 are shown as frustoconical protrusions from the top surface of the first structure 102. Also shown is a channel system 110 which comprises channels 106. The channels 106 lead to one or more of the surface relief features 104. The channels 106 communicate with the surface of the first structure 102 at one or more of the surface relief features 102. The channel system 110 may also comprise a vacuum pump 108. The vacuum pump 108 may be external to the main body of the apparatus 100. If the vacuum pump 108 is external to the main body of the apparatus 100, the channels

106 may terminate at a surface of the first structure 102. That termination may be configured to be connected to the external vacuum pump 108. The termination may comprise a valve. As illustrated in FIG. 2, suction is applied to the channels 106 by activation the vacuum pump 108. This causes air to be drawn into the apparatus where the channels 106 communicate with the surface of the surface relief features 104.

Figure 3:
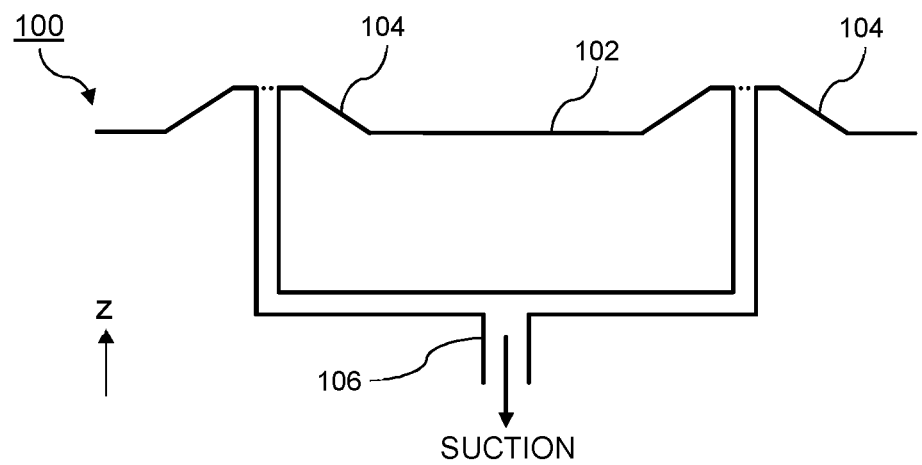
FIG. 3 shows an illustration of the first structure including a merging channel.

FIG. 3 shows an exemplary arrangement for the channel system 110. In the arrangement shown, one communal channel 106 is formed by merging channels from two surface relief features 104. There may be a set of communal channels 106, each formed by merging channels from three or more surface relief features 104. The channel system 110 may comprise a set of communal channels 106, each formed by merging channels from two or more surface relief features. The channel system 110 may comprise a single communal channel 106 formed by merging the channels from every surface relief feature on the first structure 102. In an alternative arrangement, the channel system comprises private channels, each private channel connected to a single surface relief feature.

Figure 4:
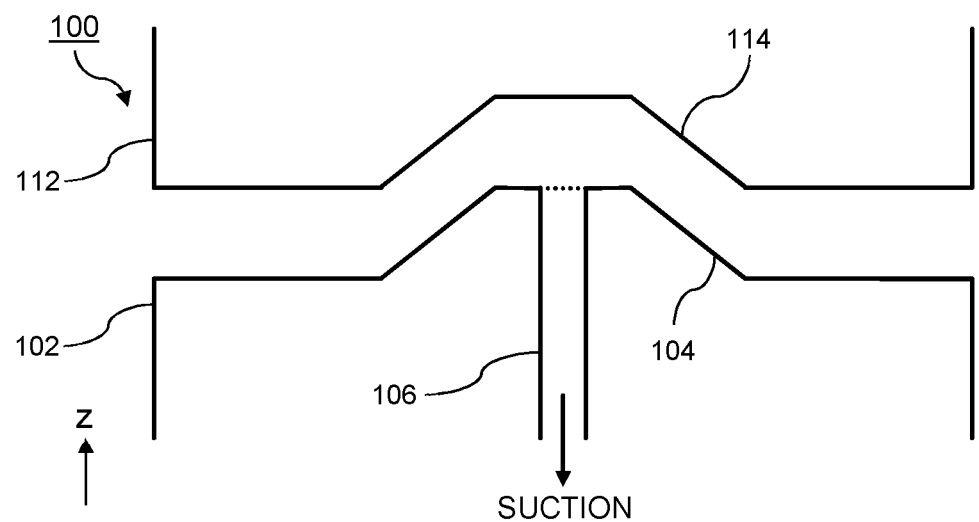
FIG. 4 shows an illustration of the first and second structures.

FIG. 4 shows the apparatus 100 in an arrangement in which the second structure 112 is brought into proximity to the first structure 102. In the example shown, the second structure 112 comprises a second surface relief feature 114. The second surface relief feature 114 has a complementary shape to that of the first surface relief feature 104. The number of second surface relief features 114 may be equal to the number of first surface relief features 104. The second surface relief features 114 are located at the surface of the second structure 112. Upon the two structures coming into contact, a self-centering effect is produced by the contact of the two surface relief features 104, 114. The force exerted by the suction acts to draw the two structures 102, 112 together. In this example, the second structure 112 will be drawn towards the first structure 102, moving in a drawing direction along the z-axis. The term 'relief' is herein used to describe a feature that may be convex or concave, or may possess both convex and concave portions.

Figure 5:
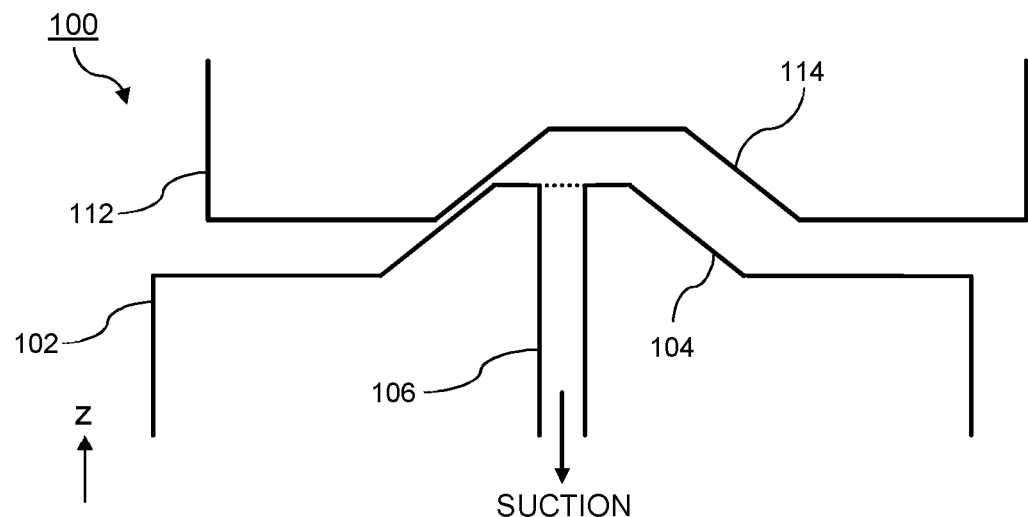
FIG. 5 shows an illustration of the first and second structures brought into proximity misaligned.

The two structures 102, 112 may be initially misaligned. In the example of FIG. 5, the two structures 102, 112 are brought into contact such that the two structures are misaligned. The structures may then be brought together in the z-direction. The force in the z-direction is generated, at least partially, by suction through the channel system 110. The contact between the tapered surface of the first surface relief feature 104 and the tapered surface of the second surface relief feature 114 causes structures 102 and 112 to move laterally (in the xy-plane) with respect to each other. The lateral movement aligns the two structures 102, 112, such that the first and second structures 102, 112 mate.

Figure 6:
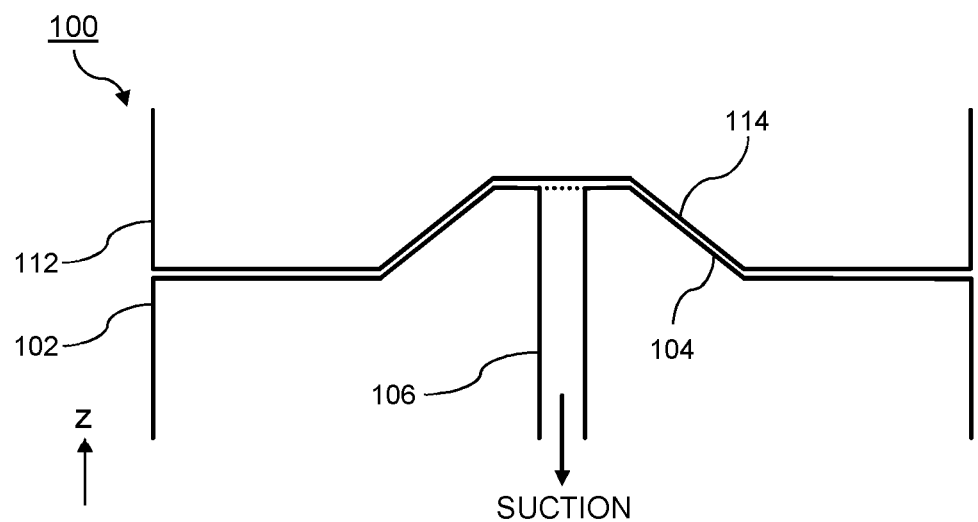
FIG. 6 shows an illustration of the first and second structures in alignment.

Alignment is thus achieved. The structures 102, 112 may be considered aligned when the first and second surface relief features 104, 114 are at a minimal possible separation. An exemplary final alignment is shown in FIG. 6. Once the structures have been aligned, the contact between the tapered surface of the first surface relief feature 104 and the tapered surface of the second surface relief feature 114 restricts relative lateral movement (in the xy-plane) between the first and second structures 102, 112. The shapes of the first and second relief features 104, 114 facilitate relative lateral movement (in the xy-plane) that improves the alignment of the structures 102, 112, whilst restricting relative lateral movement (in the xy-plane) that worsens alignment of the structures 102, 112.

Figure 7:
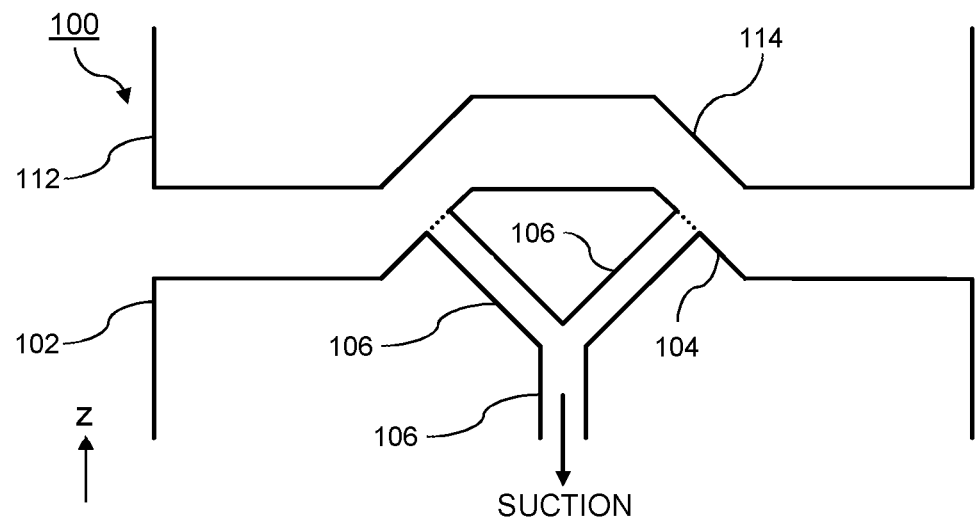
FIG. 7 shows an illustration of the first and second structures with a forking channel.

FIG. 7 shows an exemplary arrangement of the apparatus 100 having a channel system 110 in which two channels 106 communicate with the surface of a single surface relief feature 104. Although only two channels 106 are shown in FIG. 7, three or more channels 106 may communicate with the surface of a single surface relief feature 104.

Figure 8:
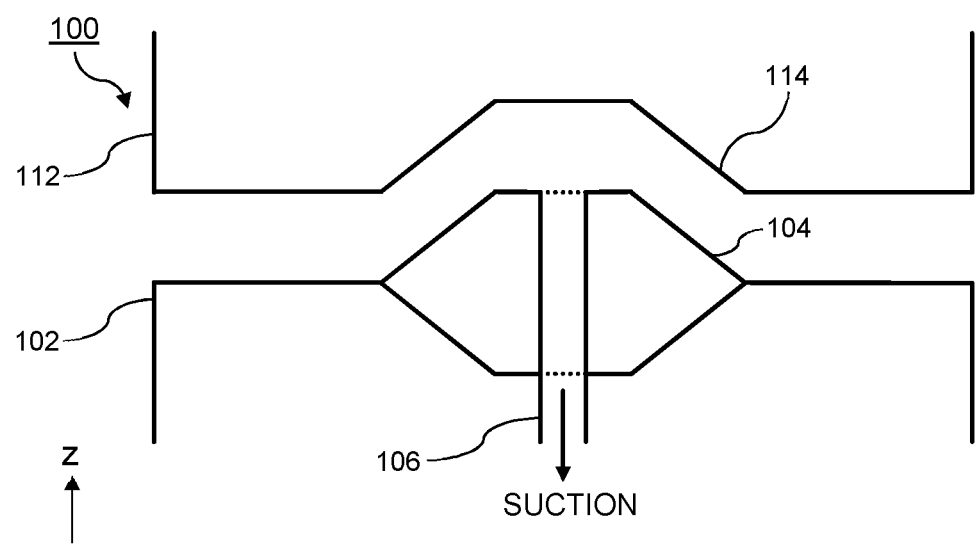
FIG. 8 shows an illustration of the first and second structures with a removable surface relief feature.

FIG. 8 shows an exemplary arrangement of the apparatus 100 in which the first surface relief feature 104 is not integral with the first structure 102. The first surface relief features 104 is a separate component to the first structure 102. In this example, the first surface relief 104 feature is removable from the first structure 102. This arrangement may be easier to manufacture than structures with integral surface relief features. For example, the arrangement may be manufactured by forming a recess in the first structure 102 to receive a removable first surface relief feature 104. This method is simpler and faster when using any type of subtractive fabrication e.g. ULI etching or computer numerical controlled (CNC) milling. This is because the amount of material removed when fabricating a recess in a surface is generally less that the amount of material removed when creating a surface with a protrusion. Two or more removable first surface relief features 104 may be connected together. Connecting removable first surface relief features 104 together allows for easier assembly.

Figure 9:
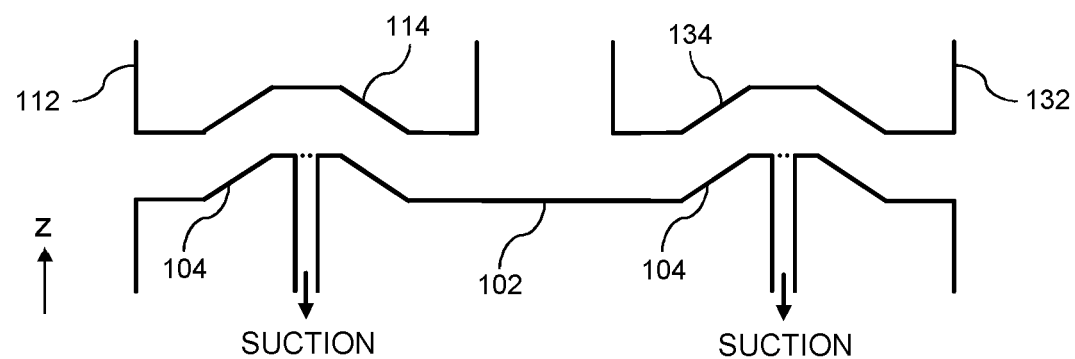
FIG. 9 shows an illustration of a third structure that may be aligned with the first structure.

Further structures may be aligned with the first and second structures 102, 112. For example, a total of three, four, five, or six structures may be aligned. FIG. 9 shows a third structure 132 that may be aligned with the first structure 102. The third structure 132 has one or more third surface relief features 134 shaped complementarily to the first surface relief features 104. As shown in FIG. 9, the second and third structures 112, 132 may each be aligned with the first structure 102. When the second and third structures 112, 132 are each to be aligned with the first structure 102, the first structure 102 must comprise two or more first surface relief features 104.

Figure 10:
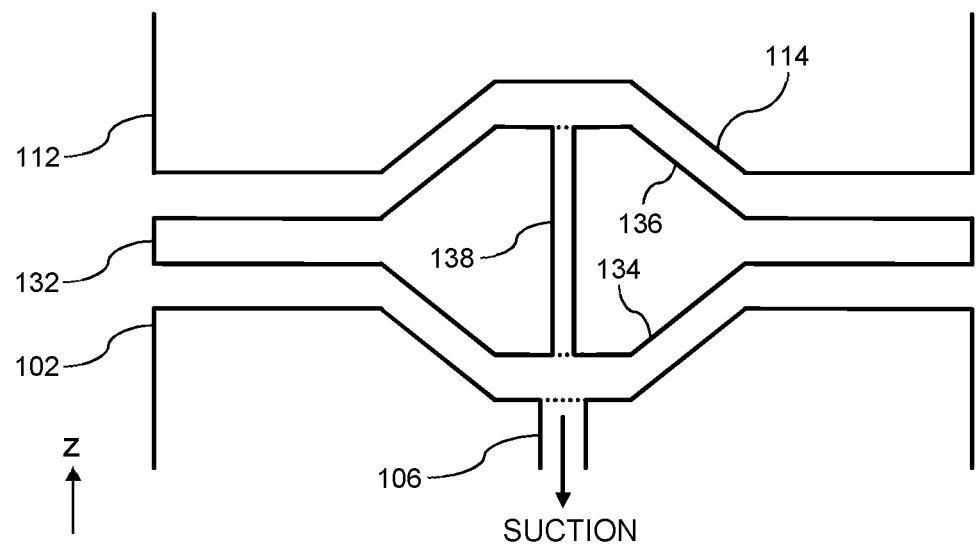
FIG. 10 shows an illustration where the third structure may be aligned with the first and second structures in a stacking configuration.

FIG. 10 shows an arrangement wherein the third structure 132 is to be aligned between the first and the second structures 102, 112 in a stacking, or interleaved configuration. The third structure may have two or more third surface relief features 134, 136. The third structure may have at least one third surface relief feature 134, 136 on each opposing surface in the drawing direction (or the stacking direction or z-direction).

The third structure 132 may have a channel system 138 comprising channels which extend through the third structure 132. The channel system 138 may extend from a third surface relief feature 134 on one surface to a third surface relief feature 136 on an opposing face. More than three structures may be aligned in a stacking configuration. Each structure that is to be aligned between two other structures may have a channel system that extends through said structure in the drawing direction.

The diameter of the channels may be varied to obtain a desired suction. For example, the channels of channel system 138 may have a smaller diameter than the channels 106 of channel system 110, as is shown in FIG. 10. If more than three structures are aligned in a stacking configuration, the channel diameter of each structure may be smaller than the channel diameter of a structure stacked adjacent to it.

Figure 11:
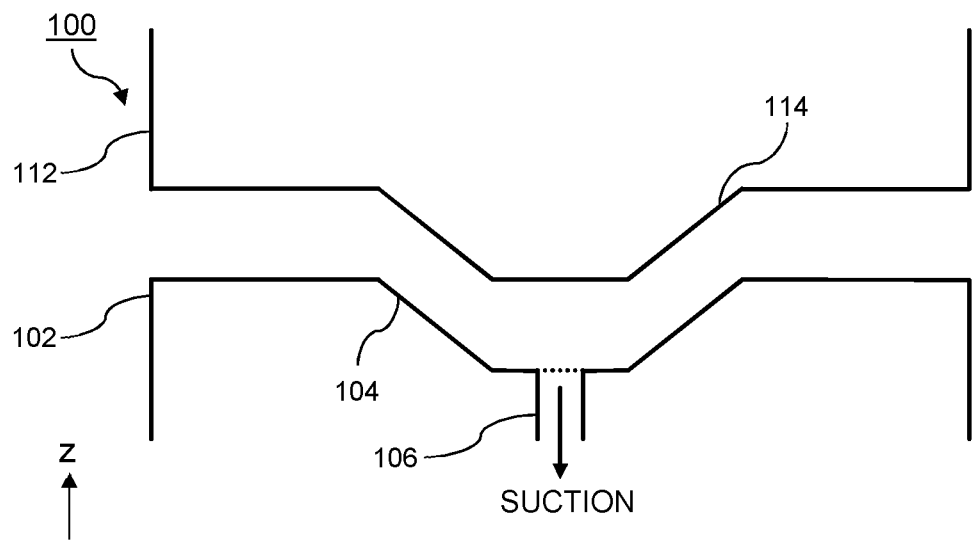
FIG. 11 shows an illustration of the first and second structures with a recess surface relief feature.

FIG. 11 shows another exemplary arrangement of the apparatus 100 in which the first surface relief feature 104 comprises a tapered recess. This is in contrast to a tapered protrusion from the surface of the first structure 102 as shown in FIGS. 4 to 8.

It should be apparent that, in order to achieve the desired self-centring effect, pairs of surface relief features 104, 114 need not be the exact complement of one another. A self-centring effect occurs if a surface relief feature protrudes from a surface of a first one of the structures, and a corresponding surface relief feature on the mating surface of the other structure comprises a tapered recess that is at least as large as the protruding surface relief feature. Certain shapes and combinations of shapes provide a more effective self-centring effect, as will be discussed in further detail below.

Figure 12:
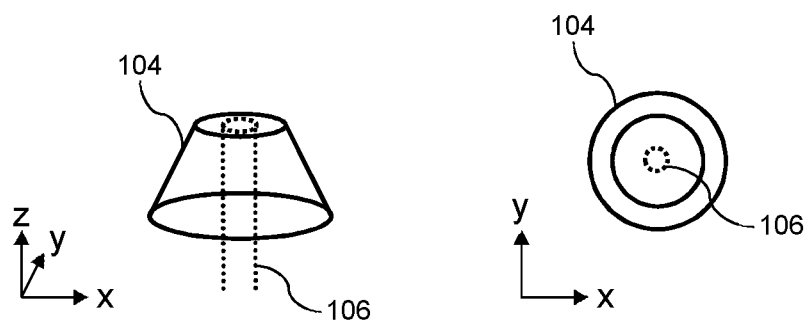
FIGS. 12 and 13 show various exemplary shapes of the surface relief features.
Figure 13:
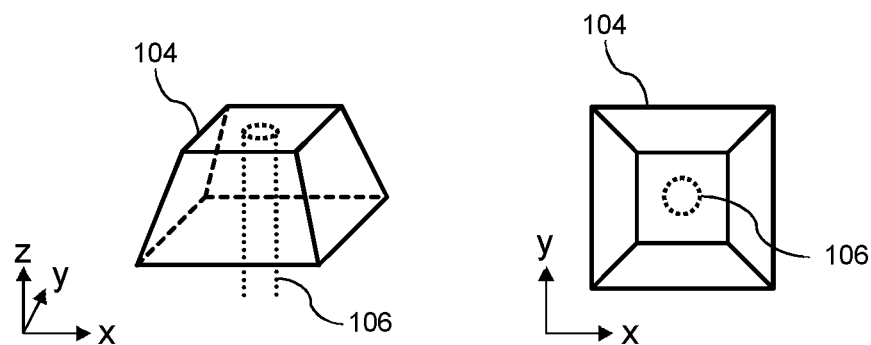

FIGS. 12 and 13 illustrate exemplary shapes for the first surface relief features 104. FIG. 12 shows a surface relief features having a frustoconical shape. FIG. 13 shows a surface relief feature having a frustopyramidal shape. A frustoconical shape may be easy to manufacture. It results in mating surface relief features not constraining the relative rotation of the first and second structures about the z-axis. The frustopyramidal shape, when combined with a corresponding recess that is not cylindrically symmetrical, restricts the relative rotation of the structures about the z-axis. Indeed, any shape that is not cylindrically symmetric, when combined with a corresponding recess that is not cylindrically symmetrical, restricts the relative rotation of the structures about the z-axis.

Each of the above examples may have structures 102, 112 comprising more than one pair of corresponding surface relief features 104, 114. The interaction between two pairs of corresponding surface relief features restricts the relative rotation of the structures 102, 112 about the z-axis. Combinations of cylindrically symmetric surface relief features, such as that shown in FIG. 12, restricts the relative rotation of the structures 102, 112 about the z-axis. Overconstraint of relative rotation may occur when, for example, two or more non-cylindrically symmetric pairs of surface relief features are employed or when three or more pairs of cylindrically symmetric surface relief features are employed. Overconstraint may improve the alignment.

A useful application for the present invention is in optical data storage technology. Optical data storage uses a pulsed laser to alter the microstructure of a three-dimensional pixel, often referred to as a voxel, within an optical storage medium, for example a glass substrate. The microstructural condition of each voxel corresponds to a given data state (for example a 1 or a 0) which can be interrogated optically. Multi-layered grids of voxels can allow large volumes of data to be stored. Optical data storage has the advantage that the stored data doesn't degrade over time, unlike conventional hard drives or magnetic tapes.

For flexible writing, reading, and re-writing of an optical storage medium, it is advantageous to quickly and accurately align the reading/writing/re-writing machine with the optical storage medium. The first structure may comprise an optical storage medium and the second structure may comprise a machine configured to perform one or more of reading, writing, and re-writing of the optical storage medium. The second structure may comprise an optical storage medium and the first structure may comprise a machine configured to perform one or more of reading, writing, and re-writing of the optical storage medium. The machine may be configured to read the data stored on the optical storage medium by shining polarized light through the optical storage medium and decoding the resultant images. The machine may be configured to write and/or re-write data on the optical storage medium by applying pulsed laser light to the optical storage medium.

Figure 14:
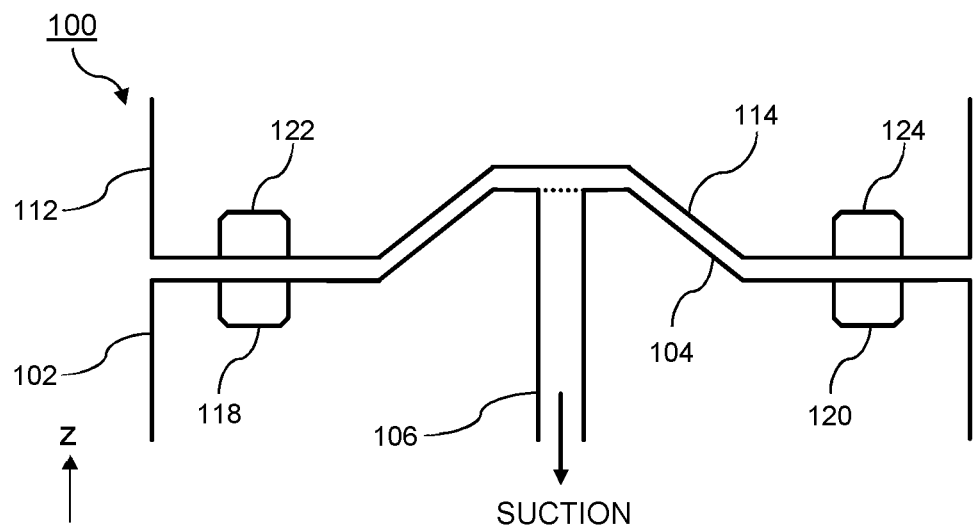
FIG. 14 shows an illustration of the first and second structures comprising functional features.

FIG. 14 illustrates the apparatus 100. In FIG. 14, the structures 102, 112 comprise one or more functional features. The first structure 102 comprises functional features 118, 120, and the second structure 112 comprises functional features 122, 124. The functional features may comprise optical components and/or mechanical components. Examples of optical components include light sources, lasers, photodetectors, cameras, optical memory elements, waveguides, lenslets, waveplates, and diffraction gratings. Examples of mechanical components include springs, latches and flexures, and microfluidic components such as channels and valves. The precise alignment of a functional feature on one structure, e.g. functional feature 118 on the first structure 102, with a functional feature on the other structure, e.g. functional feature 122 on the second structure 112, may be desirable. For example, if both functional features are waveguides, then the better aligned the waveguides, the lower the insertion loss.

Each of the surface relief features 104, 114 on each of the two structures 102, 112, as well as the channels 106, may be fabricated by a combination of an ultrafast laser inscription (ULI) writing process and wet etching (i.e. chemical etching or liquid etching). The ULI changes the etching sensitivity of regions of a glass structure by several orders of magnitude. The regions that have undergone the ULI writing process may then be removed by the etching process. The structures may be made from a fused silica glass, borosilicate glass, or any other type of dielectric glass.

In order to improve the alignment of functional features, it is advantageous to fabricate, for a given structure, the surface relief feature(s) in the same manufacturing step as the functional feature(s). For example, the surface relief features may be fabricated during the same write ULI process as the functional features. This ensures that the surface relief features are aligned with the functional features with the accuracy of the fabrication process, typically <100 nm.

The precise alignment between the surface relief features and the functional features on each structure helps to ensure the precise alignment between corresponding functional features on each structure. For example, in FIG. 14, as the offset between functional feature 118 and first surface relief 104 is known to be the same as the offset between functional feature 122 and second surface relief feature 114, when the two structures 102 and 112 are brought together, the alignment caused by the interaction of the first and second surface relief features 104 and 114, causes the functional features 118 and 122 to be precisely aligned.

The structures may be metallized in post-processing. The metallizing may include fabricating electrical components, such as connections and resistive heaters.

Figure 15:
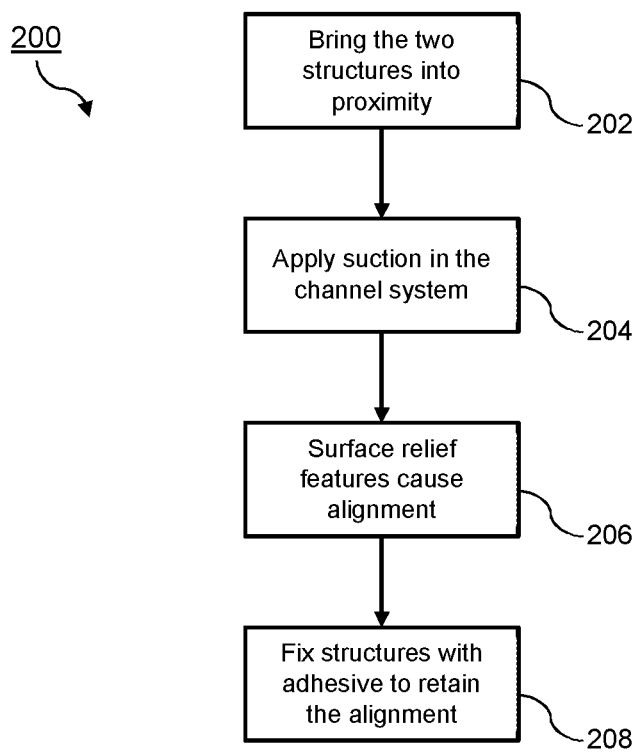
FIG. 15 illustrates a method for aligning the first and second structures.

FIG. 15 shows the steps of an exemplary method of aligning two structures, for example first and second structures 102, 112. In the first step, step 202, the two structures are brought into proximity. This may be done manually. This may be done by a pick and place machine. Step 202 may be performed relatively quickly and without precision. At this stage, exact alignment is not necessary and an amount of misalignment is permissible. The amount of permissible misalignment is proportional to the size of the surface relief features. In the example where a first surface relief feature 104 comprises a tapered protrusion and a second surface relief feature 114 comprises a tapered recess, the top of the first surface relief feature 104 should be inside the perimeter of the second surface relief feature 114 for the alignment to successfully begin. Thus, for a top of a first surface relief feature 104 with a fixed size, a larger second surface relief feature 114 allows for a larger permissible initial misalignment. Thus, the speed and/or ease of step 202, and therefore the entire method, is related to the size of the surface relief features.

One or more preliminary steps may be undertaken prior to step 202. These may include one or more of: inserting removable first surface relief features 104, fixing an external pump 108 to the channel system 110, removing unwanted dirt, dust and liquid from the structures 102 and 112 and from channel system 110, preparing the surfaces to receive an adhesive, applying solder pads for adhesion, and preparing the surfaces for ultra-sonic or thermal welding.

At step 204, suction is applied through the channel system 110. This may be done by activating pump 108. The suction may be applied through channels 106. Applying suction through channel system 110 results in a force that acts to draw the structures together. Applying the suction in step 204 has been described as taking place after the structures 102, 112 are brought into proximity in step 202. However, it should be appreciated that the suction may be applied in the channel system 110 before the structures are brought into proximity.

The drawing causes the interaction between the surface relief features to align the two structures in step 206. This alignment step may further comprise one or more active alignment methods and/or visual passive alignment methods.

At step 208 the structures 102 and 112 are fixed together with an adhesive. Fixing the structures together retains the alignment obtained by the previous step. Step 208 may be performed manually. Step 208 may be performed by an automated robotic arm. The adhesive may be applied at any point prior to step 208.

A final alignment verification may then be performed. For example, final alignment may be verified by one of more of: using a high precision laser distance detector, measuring the coupling efficiency of light between waveguides fabricated on the structures, detecting alignment markers on the structures with a microscope, using inductive position sensing, and validating the operation of sets functional features (optical, electronic, hydraulic, pneumatic components etc.) split between the substrates.

The apparatus and methods described herein may be used to align independently-fabricated arrays of micro-optical components, where monolithic fabrication is not possible or desirable. Examples of such arrays include arrays of single-mode fibres or waveguides and collimating lenslets. Collimating lenses increase the f-number of beams launched into free-space. In this case, highly precise alignment enables high-efficiency coupling of light between the waveguides and free space. More generally, the techniques described herein are useful where they lower the cost or improve the accuracy of an alignment process, or allow the process to be performed independently of a laboratory environment.

The apparatus and methods described herein enable the desired alignment accuracies to be achieved without cleanroom operation. This is in part due to the suction applied which aids in removing any dust present at the interface between the structures. This significantly reduces the cost of implementing the alignment apparatus and method. It also makes the apparatus and methods described particularly suitable for field-assemblable equipment, such lab-on-chip devices or microfluidic diagnostic equipment.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of aligning a first and a second structure, the first structure comprising one or more first surface relief features and a channel system communicating with a surface of the first structure at one or more of the first surface relief features, the second structure comprising one or more second surface relief features shaped complementarily to the first surface relief features, wherein the first and second structures each further comprise one or more functional features; the method comprising:
    applying suction in the channel system to draw the first and second structures together in a drawing direction;
    wherein, when the first and second structures are drawn together, the interaction between one or more of the first surface relief features and one or more of the second surface relief features aligns the structures in a plane perpendicular to the drawing direction such that the first and second surface relief features mate.

2. The method as claimed in claim 1, wherein the one or more first surface relief features comprise tapered protrusions from the surface of the first structure and the one or more second surface relief features comprise recesses in the surface of the second structure that are tapered complementarily to the one or more first surface relief features.

3. The method as claimed in claim 1, wherein the relative rotation of the first and second structures about an axis parallel to the drawing direction is restricted by the interaction between two or more first surface relief features with two or more corresponding second surface relief features.

4. The method as claimed in claim 1, wherein one or more of the first surface relief features and one or more corresponding second surface relief features are non-cylindrically symmetric, such that the interaction between one or more of the first surface relief features and one or more corresponding second surface relief features restricts the relative rotation of the first and second structures about an axis parallel to the drawing direction.

5. The method as claimed in claim 1, wherein the one or more first surface relief features are removable from the first structure and the first structure comprises one or more recesses, each complementarily shaped to the first surface relief features, and the method further comprising the step of:
    inserting one or more of the first surface relief features into one or more corresponding recesses.

6. The method as claimed in claim 5, wherein the channel system comprises one or more channels passing through the first structure and one or more of the first surface relief features.

7. The method as claimed in claim 1, further comprising the step of applying an adhesive to fix the first and second structures together.

8. The method as claimed in claim 1, wherein one of the first and second structures comprises an optical storage medium and the other of the first and second structures comprises a machine configured to perform one or more of reading, writing, and re-writing of the optical storage medium, and further comprising the step of reading, writing, or re-writing the optical storage medium.

9. Apparatus configured to be aligned, the apparatus comprising:
 a first structure comprising one or more first surface relief features and a channel system communicating with a surface of the first structure at one or more of the first surface relief features, and one or more functional features;
 a second structure comprising one or more second surface relief features shaped complementarily to the first surface relief features and one or more functional features; and
 wherein, when suction is applied in the channel system to draw the first and second structures together in a drawing direction, the interaction between one or more of the first surface relief features aligns the structures in a plane perpendicular to the drawing direction such that the first and second surface relief features mate.

10. The apparatus as claimed in claim 9, wherein the relative rotation of the first and second structures about an axis parallel to the drawing direction is restricted by the interaction between two or more first surface relief features with two or more corresponding second surface relief features.

11. The apparatus as claimed in claim 9, wherein one or more of the first surface relief features and one or more corresponding second surface relief features are non-cylindrically symmetric, such that the interaction between one or more of the first surface relief features and one or more corresponding second surface relief features restricts the relative rotation of the first and second structures about an axis parallel to the drawing direction.

12. The apparatus as claimed in claim 9, wherein the one or more first surface relief features comprise tapered protrusions from the surface of the first structure and the one or more second surface relief features comprise recesses in the surface of the second structure that are tapered complementarily to the one or more first surface relief features.

13. The apparatus as claimed in claim 12, wherein the one or more first surface relief features comprise conical, pyramidal, spherical segment, or ellipsoidal segment protrusions from the surface of the first structure.

14. The apparatus as claimed in claim 12, wherein the one or more first surface relief features are removable from the first structure and the first structure comprises one or more recesses shaped complementarily to the one or more first surface relief features.

15. The apparatus as claimed in claim 9, wherein one of the first and second structures comprises an optical storage medium and the other of the first and second structures comprises a machine configured to perform one or more of reading, writing, and re-writing of the optical storage medium.

16. The apparatus as claimed in claim 9, wherein the functional features comprise one or more of: light sources, lasers, photodetectors, cameras, optical memory elements, waveguides, lenslets, waveplates, and diffraction gratings, springs, latches and flexures, channels and valves.

17. A method of manufacturing the apparatus of claim 9, wherein the functional features of the first structure are manufactured in the same process as the first surface relief features.

18. The method of manufacturing as claimed in claim 17, wherein the functional features of the second structure are manufactured in the same process as the second surface relief features.

19. The method of manufacturing as claimed in claim 17, wherein the functional features are manufactured by ultrafast laser inscription followed by wet etching.

* * * * *